United States Patent
Su

(10) Patent No.: US 11,487,908 B2
(45) Date of Patent: Nov. 1, 2022

(54) SECURE MEMORY

(71) Applicant: Macronix International Co., Ltd., Hsinchu (TW)

(72) Inventor: Chun-Lien Su, Taichung (TW)

(73) Assignee: Macronix International Co., Ltd., Hsinchu (TW)

( * ) Notice: Subject to any disclaimer, the term of this patent is extended or adjusted under 35 U.S.C. 154(b) by 580 days.

(21) Appl. No.: 16/542,536

(22) Filed: Aug. 16, 2019

(65) Prior Publication Data
US 2021/0049309 A1  Feb. 18, 2021

(51) Int. Cl.
| G06F 21/00 | (2013.01) |
| G06F 21/83 | (2013.01) |
| G06F 3/06 | (2006.01) |
| G06F 11/10 | (2006.01) |
| H04L 9/32 | (2006.01) |

(52) U.S. Cl.
CPC ............ G06F 21/83 (2013.01); G06F 3/0623 (2013.01); G06F 3/0652 (2013.01); G06F 3/0659 (2013.01); G06F 3/0673 (2013.01); G06F 11/1004 (2013.01); H04L 9/3239 (2013.01); *G06F 2221/2143* (2013.01)

(58) Field of Classification Search
CPC ...... G06F 21/83; G06F 3/0623; G06F 3/0652; G06F 3/0659; G06F 3/0673; G06F 11/1004; G06F 2221/2143; G06F 2221/2145; G06F 2221/2149; H04L 9/3239
See application file for complete search history.

(56) References Cited

U.S. PATENT DOCUMENTS

| 7,303,135 | B2* | 12/2007 | Nakabe | G06F 21/6209 |
| | | | | 235/492 |
| 7,360,057 | B2* | 4/2008 | Hars | G11B 20/0021 |
| | | | | 713/193 |
| 8,412,904 | B2* | 4/2013 | Flynn | G06F 13/4022 |
| | | | | 711/E12.001 |
| 8,601,283 | B2* | 12/2013 | Jogand-Coulomb | |
| | | | | G06F 21/6218 |
| | | | | 713/168 |
| 8,954,403 | B2* | 2/2015 | Koifman | G06F 3/0661 |
| | | | | 707/693 |
| 9,519,594 | B2* | 12/2016 | Flynn | H04L 67/02 |
| 9,706,082 | B2* | 7/2017 | Pizot | H04L 63/06 |
| 10,776,025 | B2* | 9/2020 | Brown | G06F 3/0673 |
| 2008/0005589 | A1 | 1/2008 | Tsukazaki | |
| 2019/0205049 | A1 | 7/2019 | Shan et al. | |

* cited by examiner

*Primary Examiner* — Hosuk Song
(74) *Attorney, Agent, or Firm* — Fish & Richardson P.C.

(57) ABSTRACT

A memory controller, which manages a memory device, receives a memory command. The memory controller determines whether the memory command is encrypted. Upon determining that the memory command is encrypted, the memory controller performs a decryption function corresponding to the memory command. Conditioned on the performance of the decryption function resulting in a successful decryption of the memory command, the memory controller performs an operation on a memory location corresponding to a memory address included in the memory command.

27 Claims, 9 Drawing Sheets

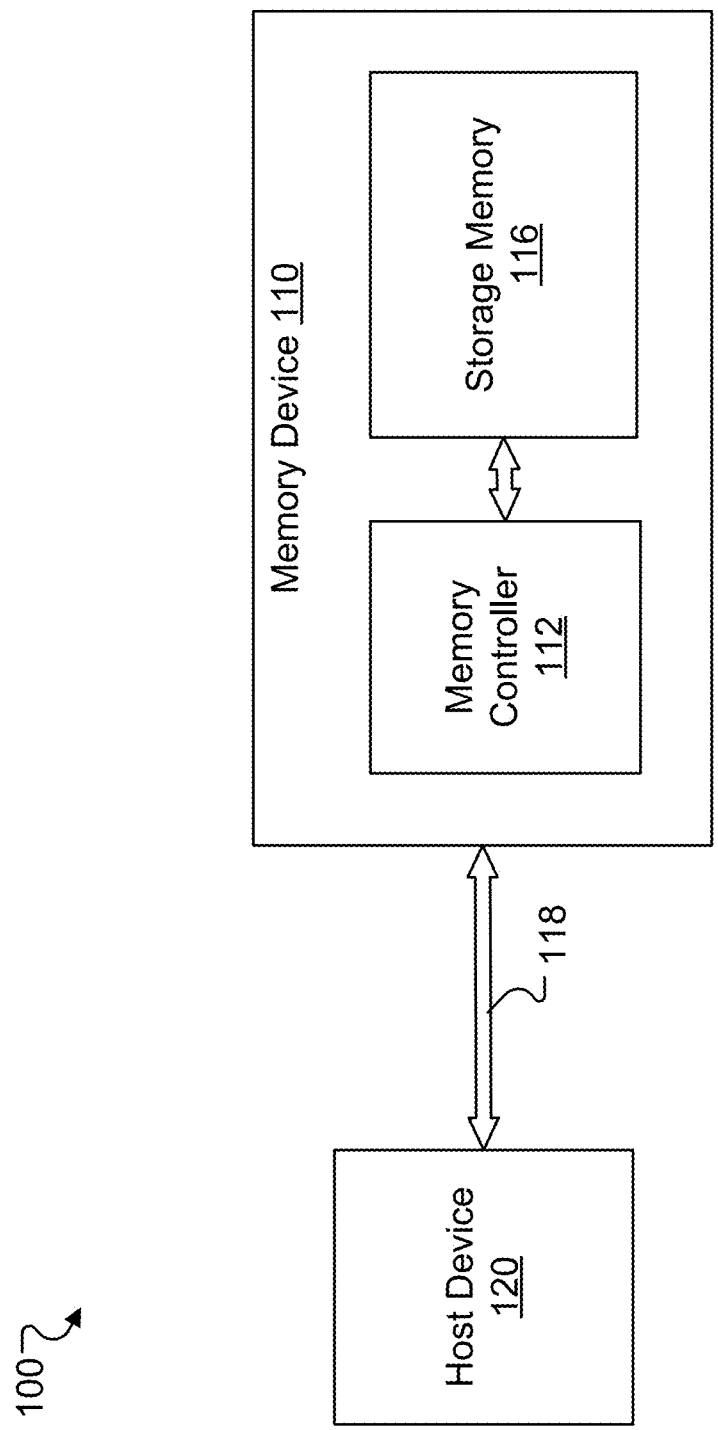

| | 220 | | 230 | | 240 | | 250 | |
|---|---|---|---|---|---|---|---|---|
| | Memory Command | | Secure CMD-1 | | Secure CMD-2 | | CMD | |
| 202 | 1st byte | | CMD | | Cipher CMD | | CMD | |
| 204 | 2nd byte | | Cipher ADD1 | | Cipher ADD1 | | Plain ADD1 | |
| | 3rd byte | | Cipher ADD2 | | Cipher ADD2 | | Plain ADD2 | |
| | 4th byte | | Cipher ADD3 | | Cipher ADD3 | | Plain ADD3 | |
| | 5th byte | | Cipher ADD4 | | Cipher ADD4 | | Plain ADD4 | |
| 206 | Authentication | | Secure CRC32 | | Secure CRC32 | | N.A. | |
| 209 | Dummy | | Dummy | | Dummy | | Dummy | |
| 208 | Data Cycles | | | | | | | |

(CMD: read/program/erase command)

FIG. 2A

| group\bit | | 0 | 1 | 2 | ... | n - 1 | n | n + 1 | ... | n+m-1 |
|---|---|---|---|---|---|---|---|---|---|---|
| Allowed | before | 111...1 (erase state/all 1) | | | | | 11...1 (erase state/all 1) | | | |
| | after | xxx...x | | | | | yy...y | | | |
| Not allowed | before | 110...1 (at least one "0") | | | | | yy...y (erase state/all 1) | | | |
| | after | 110...1 | | | | | yy...y | | | |
| Not allowed | before | yyy...y | | | | | 10...1 (at least one "0") | | | |
| | after | yyy...y | | | | | 10...1 | | | |

302 spans bits 0 through n-1; 304 spans bits n through n+m-1.

310: Allowed row
320: Not allowed row
330: Not allowed row x: data (binary number)
y: function of data (binary number)

FIG. 3

SECURE MEMORY

TECHNICAL FIELD

The following disclosure relates generally to secure memory, and in particular, to methods, apparatus and systems related to secure operations on a memory device.

BACKGROUND

A memory device includes storage memory, e.g., flash memory, and a memory controller that manages the storage memory. The memory controller receives commands from a host device to perform operations on the storage memory.

SUMMARY

The present disclosure describes methods, apparatus and systems to perform secure operations on a memory device. The memory device includes storage memory for storing data, and a memory controller for managing access to the storage memory by a host device that is coupled to the memory device. The memory controller receives cryptographically protected memory commands from one or more processors of the host device. A memory command includes a command field, e.g., one or more bytes, specifying a read, program (write) or erase operation to be performed, and an address field, e.g., one or more bytes, providing an address of a memory location on which the operation is to be performed. In some implementations, a memory command also includes a dummy field, e.g. one or more dummy bytes, which provides a wait period for the memory device, to have time to respond an operation. For a program operation, the memory command also includes data fields, e.g., one or more bytes of data. In some implementations, the command field in the memory command is encrypted. In some implementations, the address field in the memory command is encrypted. In some implementations, both the command field and the address field are encrypted. In some implementations, the memory command includes an authentication field with an authentication value that is computed by performing an authentication function on the command field, the address field, or both.

In some implementations, the host device and the memory controller share information about the authentication and encryption algorithms applied to the memory command. The host device and the memory controller also share information about the cryptographic keys used for the authentication and encryption functions.

In implementations in which the memory command includes an authentication field, the memory controller verifies the authentication value upon receiving the memory command. The memory controller proceeds with subsequent actions, e.g., decrypting the encrypted command field, or address field, or both, and performing the requested memory operation, if the authentication value is successfully verified. Otherwise, the memory controller aborts the actions.

In implementations in which the command field or the address field, or both, are encrypted, the memory controller decrypts the encrypted fields upon receiving and authenticating the memory command. The memory controller proceeds with subsequent actions, e.g., performing the requested memory operation, if the decryption is successful, e.g., yielding a recognized command field and address field. Otherwise, the memory controller aborts the actions.

In some implementations, before performing a program operation on a memory location, e.g., on a byte, word, group of bytes or a page in a memory block in the storage memory, the memory controller checks to see whether the entire memory block is in an erase state. If the entire memory block is in an erase state, then the memory controller performs the program operation. Otherwise, the memory controller aborts the program operation. In this context, a memory block, which is part of or corresponding to the memory location, refers to a known number of bytes of memory in the storage memory 116.

In some implementations, the memory device includes a tag field, e.g., one or more bits, for every memory location in the storage memory that stores data. In some implementations, the tag fields are included in the storage memory. In some implementations, when performing an erase operation on a memory block, the memory controller sets all the bits in the memory locations of the memory block to a preselected bit value, and also sets all the bits of the corresponding tag to the preselected bit value. The preselected bit value, e.g., bit value '1', is chosen such that all the bits of the memory locations and the corresponding tags together form a specific pattern, e.g., a string of '1's (the "erase pattern"). When checking whether a memory block is in the erase state, as noted above, the memory controller checks whether all the memory locations and the corresponding tags in the memory block form the erase pattern. In some implementations, the tag is additional or spare memory space managed inside the memory device, but is not accessible to external devices.

In some implementations, the memory controller receives a read command from the host device. Upon successfully authenticating or decrypting the read command, or both, the memory controller retrieves the data stored in the target memory locations. The memory controller obfuscates, e.g., masks or scrambles, the data using a mask value that is known to the host device, to generate cipher data. The memory controller sends the cipher data to the host device. In some implementations, the mask value is the memory address of the target memory locations. The memory controller obtains the memory address by decrypting the address fields in the memory command, as noted above. In some implementations with a read command to access multiple memory locations in sequence, the mask values are the corresponding memory addresses of the target memory locations by adding each offset of the target memory location to the decrypted address field.

In a general aspect, a memory controller, which manages a memory device, receives a memory command. The memory controller determines whether the memory command is encrypted. Upon determining that the memory command is encrypted, the memory controller performs a decryption function corresponding to the memory command. Conditioned on the performance of the decryption function resulting in a successful decryption of the memory command, the memory controller performs an operation on a memory location corresponding to a memory address included in the memory command.

Particular implementations may include one or more of the following features. The memory command may be an erase command, and wherein performing the operation on the memory location may comprise performing an erase operation on a memory block corresponding to the memory address.

The memory command may be a program command, and wherein performing the operation on the memory location may comprise verifying the memory location corresponding to the memory address and determining whether the memory location is in an erase state.

Upon determining that the memory location is in the erase state, the memory controller may generate a tag for the program command, and perform a program operation on the memory location, the program operation including modifying the tag in accordance with the program operation. The memory location may include data bits and tag bits, wherein determining that the memory location is in the erase state may comprise determining that every data bit and every flag bit in the memory location is set to a preselected value, and wherein an aggregation of every data bit and every flag bit with the preselected value may form a known pattern. The tag bits may include one of the preselected value, an error-correcting code (ECC) value corresponding to the data bits, a cyclic redundancy check (CRC) value corresponding to the data bits, or a flag value corresponding to the data bits.

Upon determining that at least a portion of the memory location is not in an erase state, the memory controller may abort the program operation. The memory location may include data bits and tag bits, wherein determining that at least a portion of the memory location is not in the erase state may comprise determining that at least a data bit or a flag bit in the memory location is set to a value other than a preselected value, or that an aggregation of all data bits and flag bits forms a pattern that is different from a known pattern.

The memory location may include a memory block, wherein determining that the memory location is in the erase state may comprise determining that the memory block is in the erase state. Performing the program operation on the memory location may comprise performing the program operation on one of a byte, word, or group of bytes included in the memory block.

Receiving the memory command may further comprise determining, by the memory controller upon receiving the memory command, whether the memory command includes authentication information. Upon determining that the memory command includes authentication information, the memory controller may perform an authentication function corresponding to the memory command. Conditioned on the performance of the authentication function resulting in a successful authentication of the memory command, the memory controller may perform the decryption function corresponding to the memory command. Conditioned on at least one of the performance of the authentication function failing to authenticate the memory command, or the performance of the decryption function failing to successfully decrypt the memory command, the memory controller may discard the memory command without performing the operation on the memory location.

Determining that the memory command includes authentication information may comprise determining that the memory command includes a hash value field generated by performing a hash function on one or more of a command byte or a memory address byte included in the memory command. The authentication function may include one of a 32-bit Cyclic Redundancy Check (CRC) algorithm (CRC32), or a 16-bit CRC algorithm (CRC16).

Determining that the memory command is encrypted may comprise determining that one or more of a command byte or a memory address byte included in the memory command is encrypted.

The memory command may include a read command, wherein performing the operation on the memory location may comprise performing a read operation on the memory location. The memory controller may retrieve user data stored in the memory location, encrypt the user data, and send the encrypted user data to a host device coupled to the memory device. Encrypting the user data may comprise obfuscating the user data using a mask value. The mask value may correspond to the memory address. Obfuscating the user data may comprise combining the user data with the mask value using a logical operation.

The memory command may be generated by a host device coupled to the memory device: The host device may determine the operation to be performed. The host device may generate a command field corresponding to the operation. The host device may determine the memory address for the memory location. The host device may encrypt the memory address using a cryptographic mechanism shared with the memory controller. The host device may generate the memory command by a concatenation of the command field and the encrypted memory address. The host device may send the memory command to the memory controller.

Generating the memory command may further comprise determining, by the host device, whether an authentication option is enabled. In response to determining that the authentication option is enabled, the host device may generate an authentication value corresponding to at least one of the command field or the encrypted memory address. The host device may generate the memory command by a concatenation of the command field, the encrypted memory address and the authentication value.

The memory command may be a program command, and wherein generating the memory command may further comprise appending, by the host device, user data fields to the concatenation of the command field and the encrypted memory address.

Encrypting the memory address using the cryptographic mechanism may comprise encrypting using a format preserving mechanism, wherein a format of the encrypted memory address may be same as a format of the memory address without encryption.

Implementations of the above techniques include methods, systems, memory devices and computer program products. One such method includes a memory controller or a host device, or both, executing one or more processes with the above-described operations. One such system includes a memory controller that manages a memory device, and is configured to perform some of the above-described operations. Particular implementations of the system may include a host device that is coupled to the memory device and configured to perform some of the above-described operations. One such memory device includes a memory controller that manages a storage memory, and is configured to perform the above-described operations. One such computer program product is suitably embodied in a non-transitory machine-readable medium that stores instructions executable by one or more processors. The instructions are configured to cause the one or more processors to perform the above-described operations.

Using the novel features described above and in the following sections of this specification, access to, and operations on, a memory device can be performed with strong security while maintaining efficiency of the operations. Including authentication mechanisms on the memory commands enable the memory controller to verify that the memory commands are legitimately generated by the host device, and have not been tampered by an adversarial entity. Lightweight authentication mechanisms, such as CRC32, are used, which limit the performance overhead of the authentication operations.

By performing command-based cryptography, e.g., limiting the authentication and encryption to the command fields, or the address fields, or both, while excluding the data, the performance impact of the encryption/decryption operations is limited, since the size of the command fields, or the address fields, or both, are comparably less than the size of the data. This is in contrast to conventional approaches in which the data is encrypted and/or authenticated. Encrypting the command fields, or the address fields, or both, or obfuscating the data that is sent in response to a read command, enable secure traffic on the bust connecting the host device and the memory device, while preventing an adversarial entity, who monitors the traffic by eavesdropping on the bus, from learning the contents of the transactions. The host device and the memory controller use symmetric encryption mechanisms, or lightweight logical operations such as exclusive-or (XOR) for data obfuscation, to limit the computational overhead of the cryptographic operations, compared to approaches that rely on asymmetric (e.g., public key infrastructure or PM-based) cryptography.

In some implementations, the memory controller provides robust security by performing a program operation only if the corresponding memory block is in an erase state. In doing so, partial bit alteration of a byte in a memory location is not allowed, which helps to prevent unauthorized modifications to data stored in the memory device. By checking for the erase pattern formed by the data bits and tag bits to determine whether a target memory location is in an erase state, the memory controller avoids false positives, e.g., by mistaking the actual stored data and corresponding tag for the erase pattern. Accordingly, this technique prevents accidental, or unauthorized, modification to the data or partial data stored in the memory device.

The disclosed techniques can be applied to various types of non-volatile memory devices, such as NAND flash memory, NOR flash memory, or phase-change memory (PCM), among others. Additionally or alternatively, the techniques can be applied to various types of main or cache memory devices, such as static random access memory (SRAM), dynamic random access memory (DRAM), resistive random access memory (ReRAM), or magnetoresistive random-access memory (MRAM), among others.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 1 illustrates an example of a system that performs secure operations on a memory device.

FIGS. 2A and 2B illustrate example structures of a secure memory command showing the various fields.

FIG. 3 illustrates examples of bit patterns in a memory location corresponding to allowed and disallowed program operations.

Like reference numbers in the figures indicate like elements.

DETAILED DESCRIPTION

Figure 2B:
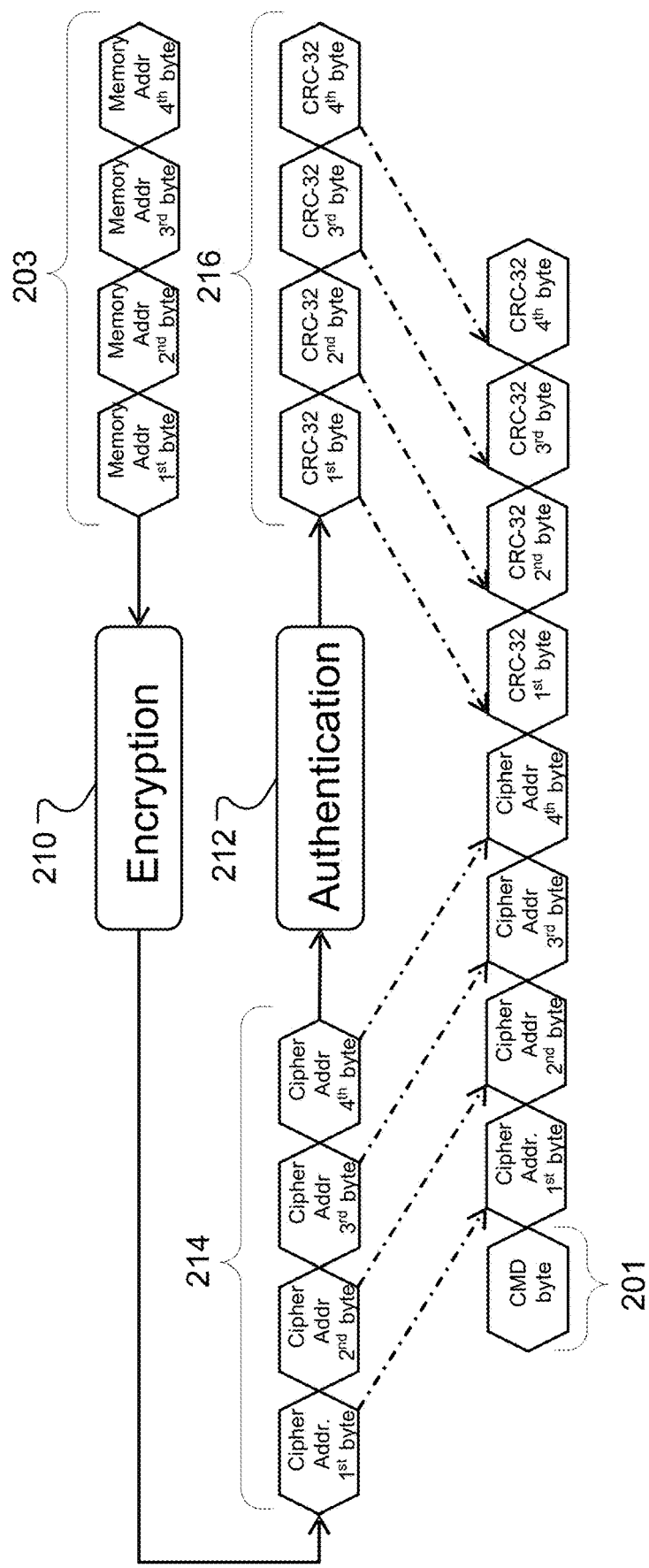

FIG. 1 illustrates an example of a system 100 that performs secure operations on a memory device 110. The system 100 includes the memory device 110 that is coupled to a host device 120 using a bus 118. The memory device 110 includes a memory controller 112 and a storage memory 116.

In some implementations, the memory device 110 is a storage device. For example, the memory device 110 can be an embedded multimedia card (eMMC), a secure digital (SD) card, a solid-state drive (SSD), or some other suitable storage. In some implementations, the memory device 110 is a client device that is coupled to a host device 120. For example, the memory device 110 can be an SD card that is coupled to a digital camera or a media player as the host device 120.

The memory controller 112 is a general-purpose microprocessor, or an application-specific microcontroller. The memory controller 112 manages access to, and operations performed on, the storage memory 116. The following sections describe the various techniques based on implementations in which the memory controller 112 is used to manage the storage memory 116. However, the techniques described in the following sections are also applicable in implementations in which another type of controller in the memory device 110, different from a memory controller, is used to manage the storage memory.

In some implementations, the storage memory 116 is a non-volatile memory that is configured for long-term storage of instructions and/or data, e.g., a NAND or NOR flash memory, or some other suitable non-volatile memory. In implementations where the storage memory 116 is NAND or NOR flash memory, the memory device 110 is a flash memory device, e.g., a flash memory card, and the memory controller 112 is a flash controller. For example, in some cases, the memory device 110 is a Serial Peripheral Interface (SPI) device, with the storage memory being NOR or NAND flash memory. For illustration purposes, the following description uses a flash memory as an example of the storage memory 116.

As discussed in further detail below, the host device 120 generates cryptographically secure memory commands and sends them to the memory controller 112 using the bus 118. In some implementations, the bus 118 is an SPI bus. The memory commands include read, program or write, and erase commands. Each memory command includes a command field with one or more command bytes that identifies the type of memory operation, e.g., read, program or erase, which is to be performed on the storage memory 116. Each memory command also includes an address field with one or more address bytes that specifies the address of the memory location in the storage memory 116 on which the memory operation is to be performed. For memory commands corresponding to program operations, the memory command further includes a data field with one or more bytes of data.

FIGS. 2A and 2B illustrate example structures of a secure memory command showing the various fields. Column 220 in FIG. 2A identifies the various fields in the authenticated memory command. As described above and shown in FIG. 2A, a memory command includes a command field 202, an address field 204, an authentication field 206, and a data field 208. In some implementations, the memory command also includes a dummy field 209, e.g., with one or more bytes of padding.

Column 220 shows the command field 202 as one byte in size, e.g., including the 1" byte of the memory command. However, other sizes, e.g., a command field of two bytes or three bytes, is also possible. The command field includes instructions for one of a read, program or an erase command ("CMD"). The address field 204 is shown as 4 bytes in size, e.g., including the $2^{nd}$, $3^{rd}$, $4^{th}$ and $5^{th}$ bytes of the memory command. However, other sizes, e.g., an address field of three bytes or five bytes, are also possible.

The data field 208 includes one or more data cycles, with each data cycle having one or more bytes. In some implementations, the size of the data field 208 is an order of magnitude larger than the size of either the command field 202 or the address field 204. For example, the command field 202 is shown to be one byte and the address field 204 is shown to be 4 bytes, while the data field 208 can be 16 bytes, or 32 bytes, or another suitable size.

The host device 120 cryptographically secures the memory command by performing an authentication, or encryption, or both, on one or more command bytes, or one or more address bytes, or both. The host device includes an authentication field in memory commands that are authenticated. For example, as shown in column 220 of FIG. 2A, the authenticated memory command structure includes an authentication field 206. The authentication field has a value corresponding to an authentication function that is performed on one or more bytes of the command field 202, or one or more bytes of the address field 204, or both. The authentication function is described in greater detail in the following sections.

Different sections of the memory command can be encrypted. For example, as shown in by the example structure 230 of FIG. 2A, in some implementations, the host device encrypts the address field 204, without encrypting the command field 202 or other fields. In these implementations, the memory command sent from the host device 120 to the memory controller 112 over the bus 118 includes encrypted values of the memory address bytes, e.g., Cipher ADD1, Cipher ADD2, Cipher ADD3 and Cipher ADD4. However, the command byte, e.g., COMMAND, is sent as unencrypted plaintext.

As another example, shown in the example structure 240 of FIG. 2A, in some implementations, the host device encrypts the command field 202 and the address field 204, without encrypting other fields. In these implementations, the memory command sent from the host device 120 to the memory controller 112 over the bus 118 includes encrypted values of the command bytes, e.g., Cipher CMD, and encrypted values of the memory address bytes, e.g., Cipher ADD1, Cipher ADD2, Cipher ADD3 and Cipher ADD4.

In some implementations, the authentication function is performed on the encrypted values of the address field, or the command field, or both. For example, for the example of the structure 230 in FIG. 2A, the value in the authentication field 206 is a Secure CRC32 (where CRC32 refers to 32-bit Cyclic Redundancy Check hash algorithm), which is computed on the encrypted values of the memory address bytes Cipher ADD1, Cipher ADD2, Cipher ADD3 and Cipher ADD4, or the unencrypted command byte CMD, or both.

FIG. 2B illustrates an example of encryption and authentication functions performed by a host device on a memory command with the structure 230. The host device, e.g., host device 120, determines the target memory address 203 for the memory operation. As shown, in this example the target memory address 203 has 4 bytes. The host device 120 encrypts the cleartext target memory address 203 using the encryption function 210, to generate the encrypted memory address 214, which has four ciphered bytes. The host device 120 then authenticates the encrypted memory address 214 using the authentication function 212, to generate the authentication value 216. In this example, the authentication is performed on the memory address bytes, and not the command byte(s). As shown, in some implementations the authentication value 216 is 4 bytes in size. However, other sizes of the authentication value 216 are possible in other implementations.

In some implementations, the authentication value is a message authentication code (MAC) that is generated by performing a hash operation on the bytes of the command field, or the address field, or both. The hash operation involves generating a checksum on the content that is input to the function, e.g., the encrypted address 214. As shown by the examples of FIGS. 2A and 2B, in some implementations, Secure CRC32 is used as the hash function for authentication, which provides security while being computationally efficient. However, other algorithms are also possible in other implementations. For example, 16-bit CRC (CRC16), or Message Digest version 4 or 5 (MD4 or MD5) with Secure Hash Algorithm version 1 or version 2 (SHA1 or SHA2) can be used. Alternatively, keyed hash message authentication code (HMAC) can be used. In all these implementations, the host device 120 and the memory controller 112 agree beforehand on the authentication algorithm, e.g., through a handshake mechanism or with the algorithms programmed into each device by an administrator.

After generating the authentication value 216, the host device 120 inserts the encrypted memory address 214 in the address field 204 of the memory command, which follows the command field 202 that includes the command byte 201 in the clear. The host device 120 also inserts the authentication value 216 into the authentication field 206 that follows the command field in the memory command.

Reverting to FIG. 2A, for the example of column 240, the value in the authentication field 206 is a Secure CRC32 that is computed on the encrypted values of the memory address bytes Cipher ADD1, Cipher ADD2, Cipher ADD3 and Cipher ADD4, or the encrypted command byte Cipher CMD, or both. Performing the authentication on the encrypted values allows the memory controller 112 to verify the authentication first, using the encrypted bytes of the memory command, without having to perform the decryption operations first, which can be computationally more expensive.

In some implementations, the encryption function uses a symmetric encryption algorithm, e.g., Data Encryption Standard (DES) or a variant, Advanced Encryption Standard (AES), Blowfish, RC4, among others. In these implementations, the host device 120 and the memory controller 112 agree beforehand on the encryption algorithm, e.g., through a handshake mechanism or with the algorithms programmed into each device by an administrator.

In some implementations, Format Preserving Encryption (FPE) methods, e.g., National Institute of Standards and Technology (NIST) standard SP 800-38G, are used for the encryption function. When FPE is used, elements of a set of size k bytes (k is a positive integer) is encrypted into a set of the same size. For example, a 4-byte memory address is encrypted into a 4-byte cipher address, which fits into the address field 204 of the memory command. In this manner, FPE converts information (e.g., a memory address or a command) into an encrypted format that appears valid, but that cannot be mapped to the original value.

In some implementations, the host device 120 and the memory controller 112 agree beforehand on the key(s) or token(s) to be used for the secure hash operations, or symmetric encryption operations, or both. For example, in such cases, the key(s) can be programmed into each device by an administrator.

In some implementations, the host device 120 and the memory controller 112 dynamically determine the key(s) or token(s) to be used for the secure hash operations, or the symmetric encryption operations, or both. For example, the keys are exchanged between the host device 120 and the memory controller 112 by bootstrapping, or on demand after boot, using key exchange mechanism relying on public key cryptography, e.g. Rivest-Shamir-Adleman (RSA) or Elliptic-curve Diffie-Hellman (ECDH) cryptography. As one example, the memory controller 112 knows the public key of a public-private key pair assigned to the host device 120. The memory controller 112 generates a symmetric key for encryption (or for secure hash, as the case may be), encrypts the key using the public key of the host device 120, and sends a key exchange message to the host device 120 with the encrypted public key. The host device 120 decrypts the encrypted symmetric key using its private key (which is known only to the host device 120, thereby preventing others from being able to obtain the decrypted symmetric key). Subsequently, the host device 120 can use this symmetric key for the cryptographic operations, knowing that the memory controller 112 shares the same key and can decrypt messages that are encrypted with this key. In some implementations, key generation and exchange is in the reverse direction. In such cases, the host device 120 generates a symmetric key, encrypts the symmetric key using a private key of the host device 120, and sends the encrypted key to the memory controller 112. The memory controller 112 obtains the symmetric key by decrypting using a public key corresponding to the host device private key used for the encryption.

The host device 120 sends a secure memory command, e.g., with the memory command structure 230 or 240, to the memory controller 112 over the bus 118. As described in greater detail in the following sections, the memory controller 112 uses a matching authentication algorithm and the shared authentication key(s) or token(s), to compute an authentication value on the received bytes of the command field 202, or the address field 204, or both. The memory controller 112 compares the computed value to the value of the authentication field 206 in the received memory command. If the two values match, then the memory command is verified as correct, e.g., there has been no modification by an unauthorized entity while being sent over the bus 118. If the two values do not match, then the memory command cannot be verified as correct, and the memory controller discards the command without performing in further operation.

If the memory command is verified as correct, then the memory controller 112 uses a matching decryption algorithm and the shared symmetric key(s) to decrypt the encrypted bytes of the address field, or the command field, or both. Following successful decryption, the memory controller 112 proceeds with performing the memory operation indicated by the decrypted command field, on the memory location identified by the decrypted memory address in the address field.

The secure memory command 230 or 240 can be contrasted with a conventional memory command 250, shown in FIG. 2A, which is not secure. As shown, for the conventional memory command 250, neither the byte of the command field 206, nor any byte of the address field 204, is encrypted. Further, no authentication value is computed on the command field 202 or the address field 250, and the memory command 250 does not include an authentication field 206.

An adversary who reads a memory command sent from the host device 120 to the memory controller 112 by eavesdropping (e.g., tapping) the bus 118 will not be able to know the memory address when either secure memory command 230 or 240 structure is used, since the address field bytes are encrypted. For the memory command 240, the adversary also will not be able to know the specific memory operation (read, program or erase) in the command, since the command field byte is also encrypted. Further, in case of either memory command 230 or 240, if the adversary tampers with the memory command by changing one or more bytes of the command field or the address field (e.g., a "man-in-the-middle attack"), such an unauthorized modification will be detected by the memory controller 112, since the authentication value computed by the memory controller on the modified bytes of the command field or the address field, or both, will not match the authentication value generated by the host device 120. This is because the adversary, not knowing the shared key of the host device and the memory controller used for the secure authentication function, will not be able to generate an authentication value on the modified bytes that will verify at the memory controller.

In contrast, by using the unsecure memory command structure 250, an adversary could easily modify one or more bytes of the command field or the address field, or both, without the modification being detected by the memory controller. Conventional approaches to provide security to the memory commands encrypt and/or authenticate the data fields, in addition or as an alternative to encrypting the address or command fields. Since the number of bytes in the data field is typically much higher (e.g., 16 bytes, 32 bytes, or more) than the number of bytes of the command field (e.g., 1 byte) or address field (e.g., 4 bytes), the computational complexity and resource expenditure to perform authentication and/or encryption operations on the data fields is much higher compared to performing similar cryptographic operations on the address and/or command fields, as described by the implementations in this specification. Accordingly, by using the secure memory command structure 230 or 240 and the corresponding techniques described in this specification, memory operations performed on a memory device can be made robust against security attacks while also achieving much higher efficiency compared to conventional security approaches that encrypt the data fields.

In some implementations, the memory controller 112 provides additional security by allowing for program operations on memory locations to proceed if the corresponding memory blocks are in an erase state only. This is useful where the storage memory 116 is flash memory, which requires a memory block to be erased before being programmed. The additional security mechanism provided by the memory controller—allowing a program operation only if the full memory block is in erase state—further prevents reprogramming of memory locations, and accordingly ensures that partial modifications to the data stored in a memory location, e.g., a partial bit alteration of a memory byte, is not allowed.

To provide this security mechanism, the memory controller 112 determines whether a memory location is in an erase state by checking for a specific pattern (the "erase pattern") of all the bits in the corresponding block. The erase pattern is preselected by the memory controller 112 as indicating the erase state. In some implementations, the erase pattern selected is a string of all '1' bit values for the bits of the memory location. However, other patterns are also possible in different implementations.

To avoid conflicts with situations where the actual data stored in a memory location is in the same pattern as the erase pattern, the memory controller uses a tag field corresponding to the memory location, to indicate a different between user data and erase state. In some implementations, the tag field is a single bit that the memory controller sets to a specific value to indicate an erase condition of the corresponding memory location. For example, the single tag bit is set to '1' to indicate erase, but set to '0' to indicate that the memory location is storing data.

In some implementations, the tag field includes more than one bit. In some cases, parity bits are used for the tag field. For example, the memory device 110 can use 3 bits for a CRC3 parity check on the data stored in the storage memory 116. In such cases, the tag field includes 3 bits. Alternatively, the memory device 110 can use 3 bits for an error-correcting code (ECC) parity check for each byte stored in the memory 116. CRC or ECC parity bits can be used for not only data integrity purpose but also as a tag. When the memory controller 112 performs an erase operation on a memory location, the memory controller sets all the data bits of the memory location and all the parity bits for the memory location to a preselected value, such that all the data bits and the parity bits together form the erase pattern. For example, in some implementations, the memory controller 112 sets all the data bits and the corresponding parity bits to bit value '1', forming a string of all '1' bit values as the erase pattern. However, when the memory controller performs a program operation on the memory location, the memory controller sets the parity bits to a value that is a parity function on the data stored in the memory location. In this manner, the memory controller 112 takes advantage of an existing field in the storage memory, e.g., the parity bits, to provide improved data integrity for the memory operations, apart from providing integrity of the stored data.

FIG. 3 illustrates examples of bit patterns in a memory location corresponding to allowed and disallowed program operations. As shown, a memory command from the host device 120 to the memory controller 112 targets a memory location 302 to perform a program operation. The memory location has a corresponding tag field 304. In some implementations, the number of bits in the memory location is n, while the number of bits in the tag field is m (n and m are positive integers).

In the examples of FIG. 3, the erase pattern is a string of '1' bit values for bits of the memory location and the tag field. Row 310 illustrates an example of a program operation that is allowed. In this case, before the memory location 302 is programmed, all n bits 0, 1, 2, . . . , n−1 of the memory location 302 has bit value '1', and all m bits n, n+1, . . . , n+m−1 of the tag field 304 also has bit value '1'. The bit string formed by the n+m bits of the memory location 302 and the corresponding tag field 304 accordingly forms the erase pattern-a string of '1' bit values. The memory controller 112 had set all the bits of the memory location 302 and the corresponding tag field 304 to '1' bit value during a previous erase operation, to form the erase pattern indicating that the memory location 302 is in an erase state.

The memory controller 112 checks that bit string formed by the n+m bits forms the erase pattern and thus verifies that the target memory location 302 is in the erase state. After the successful verification, the memory controller 112 programs the memory location 112 with the data "xxx . . . x" obtained from the data field of the program memory command. Since the memory location 302 is now programmed, the memory controller 112 uses the bits of the tag field 304 to store a parity value corresponding to the data stored in the memory location 302. The memory controller computes a parity value "yy . . . y" as a function of the data "xxx . . . x" and stores the parity value in the m parity bits of the tag field 304.

Rows 320 and 330 illustrate examples of program operations that are not allowed. For the row 320, at least one bit in the memory location 302 has a bit value '0' before the program operation is performed. The pattern formed by the n+m bits of the memory location 302 and the tag field 304 is therefore not the erase pattern, which is a string of '1' bit values. For the row 330, at least one bit in the tag field 304 has a bit value '0' before the program operation is performed. Here also, the pattern formed by the n+m bits of the memory location 302 and the tag field 304 is therefore not the erase pattern. Accordingly, in either case, upon checking the bit string formed by the n+m bits before the program operation, the memory controller 112 notes that the pattern formed by the bit string, including at least one '0', is different from the erase pattern of all '1' values. The memory controller 112 thus determines that the target memory location 302 is not in the erase state in either case. Upon making such a determination, the memory controller 112 aborts the program operation, leaving the bit values in the memory location 302 and the tag field 304 unchanged.

In the above manner, the techniques described in the disclosed implementations use a built-in tag field (e.g., parity bits implemented by ECC, CRC or a flag bit) to control program operations in a memory device. A memory location, e.g., a byte, word, a group of bytes, or a page, is programmed only when all bits to be written, including the bits of the tag field, are in the erase state. Partial bit alterations are not allowed even from the erase state to the program state.

Figure 4:
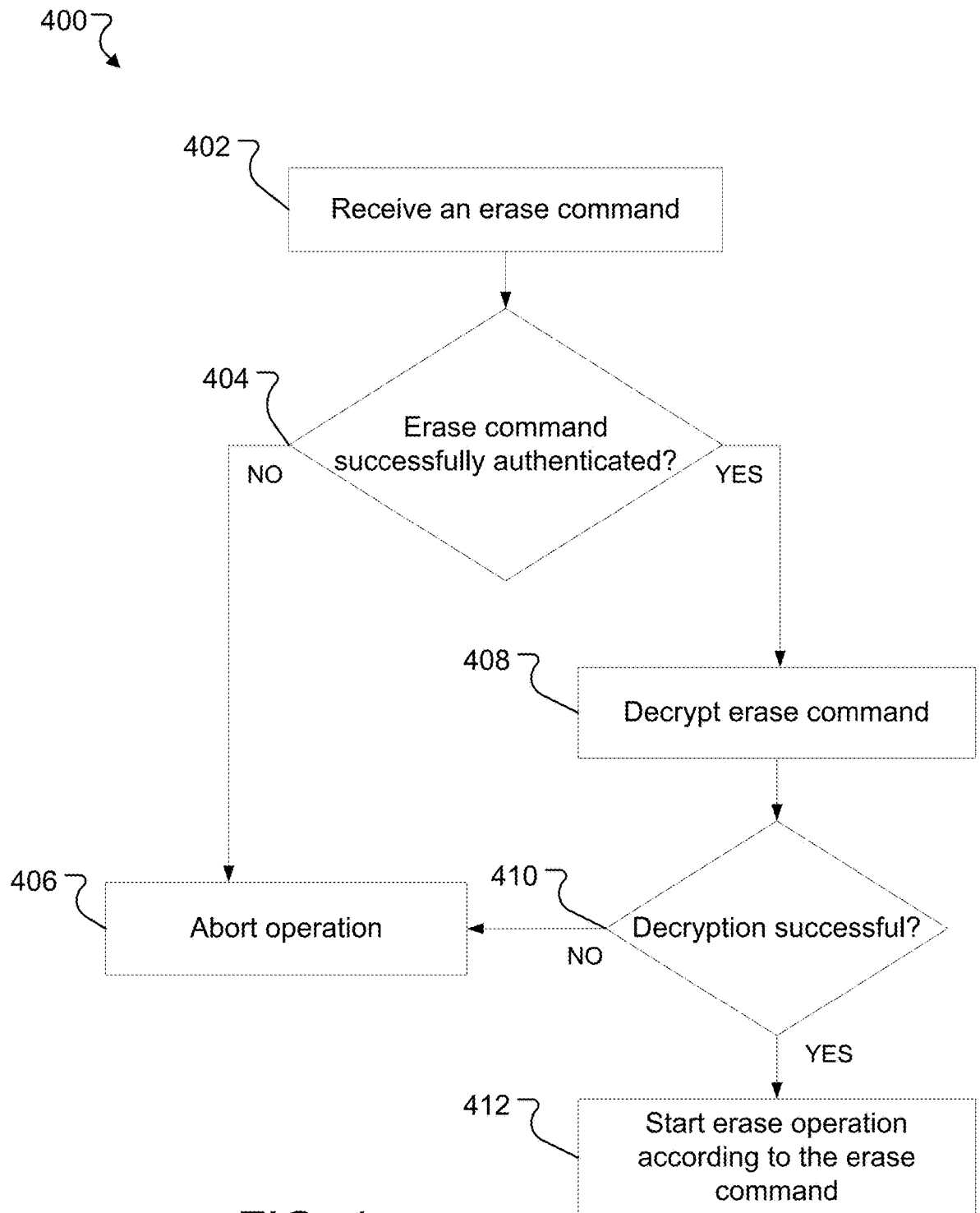
FIG. 4 illustrates an example of a process to securely execute an erase command on a memory device.

FIG. 4 illustrates an example of a process 400 to securely execute an erase command on a memory device. In some implementations, the process 400 is performed by the memory controller 112 of the memory device 110 upon receiving an erase memory command from the host device 120, to erase a memory location indicated by the memory address included in the memory command. Accordingly, the following sections describe the process 400 with respect to the memory controller 112. However, the process 400 also may be performed by other devices.

The process 400 starts when the memory controller receives an erase command (402). For example, the memory controller 112 receives a memory command from the host device 120. In some implementations, the memory command has a structure 230, while in other implementations, the memory command has a structure 240.

The memory controller determines whether the erase command is successfully authenticated (404). For example, the memory controller 112 performs an authentication function on one or more bytes of the command field, or one or more bytes of the address field, or both, included in the memory command. The memory controller uses the same authentication algorithm as used by the host device 120, and performs the authentication using an agreed-upon authentication key shared with the host device 120. The memory controller 112 compares the value resulting from the authentication function with the value received in the authentication field 206 of the memory command. If the two values match, the memory controller 112 determines that the erase command is successfully authenticated. However, if the two values do not match, then the memory controller 112 determines that the erase command is not successfully authenticated.

If the erase command is not successfully authenticated, then the memory controller aborts the operation (406). For example, upon determining that the erase command is not successfully authenticated, the memory controller 112 discards the memory command and aborts further steps of the erase operation.

On the other hand, if the erase command is successfully authenticated, then the memory controller decrypts the erase command (408). For example, in some implementations, the memory command structure 230 is used for the memory commands. In such implementations, the host device 120 sends the memory command with the address field 204 encrypted. The memory controller 112 decrypts the encrypted address bytes, e.g., Cipher ADD1, Cipher ADD2, Cipher ADD3 and Cipher ADD4, using an encryption/decryption algorithm and a shared symmetric key previously agreed upon with the host device (e.g., through a handshake or hardcoded, as discussed previously).

In some implementations, the memory command structure 240 is used for the memory commands. In such implementations, the host device 120 sends the memory command with both the command field 202 and the address field 204 encrypted. The memory controller 112 decrypts the encrypted command byte(s), e.g., Cipher CMD, and encrypted address bytes, e.g., Cipher ADD1, Cipher ADD2, Cipher ADD3 and Cipher ADD4, using encryption/decryption algorithms and shared symmetric keys previously agreed upon with the host device (e.g., through a handshake or hardcoded, as discussed previously).

In some implementations, the same encryption/decryption algorithm is used for both the command field and the address field. In other implementations, different encryption/decryption algorithms are used for the command field and the address field, for more robust security.

In some implementations, the same symmetric key is used for encryption/decryption of both the command field and the address field. In other implementations, different symmetric keys are used for encryption/decryption of the command field and the address field, for more robust security.

The memory controller determines whether the decryption is successful (410). For example, the memory controller checks whether it has successfully obtained the cleartext command, or the cleartext target memory address, or both.

If the decryption is not successful, then the memory controller aborts the operation (406). For example, the symmetric key used by the memory controller 112 may be corrupted, or the host device 120 may use a different encryption/decryption algorithm or different key (e.g., due to an incorrect handshake mechanism). In such cases, upon decrypting the erase command, the memory controller 112 may determine that the command information is incorrect (e.g., does not indicate any of read, program or erase), or the address is incorrect (e.g., outside the range of programmable addresses in the storage memory 116). Upon such a determination, the memory controller discards the memory command and aborts further steps of the erase operation.

On the other hand, if the decryption is successful, then the memory controller starts the erase operation according to the erase command (412). For example, upon successful decryption, the memory controller 112 obtains the cleartext target memory address from the memory command. Additionally, in implementations that use the memory command structure 240, the memory controller obtains the cleartext command. The memory controller then starts to erase the memory location in the storage memory 116 indicated by the target memory address. As described previously, in performing the erase operation, the memory controller sets every data bit in the memory location, and also every corresponding tag field bit, to a preselected value (e.g., '1' bit value) to form the erase pattern (e.g., a string of '1' bit values).

Accordingly, using the process 400, the devices in the system 100 (e.g., the memory controller 112 and the host device 120) perform a secure erase operation on the storage memory 116. Given the importance of the erase operation as a security feature for a program operation (e.g., a memory location has to be in the erase state before the memory location can be programmed, as discussed above) the process 400 ensures that the erase command is authenticated before the erase operation can be performed.

Figure 5:
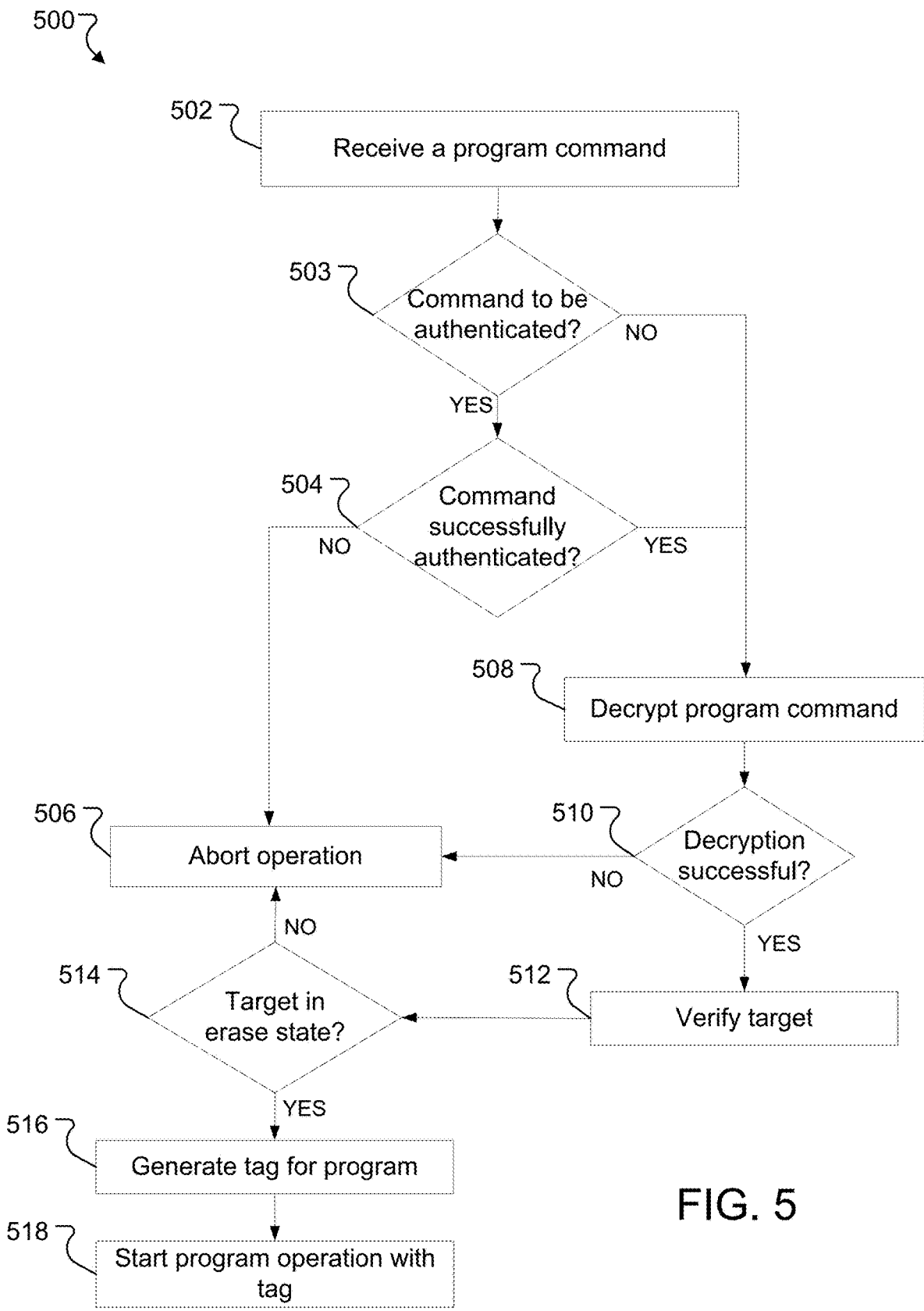
FIG. 5 illustrates an example of a process to securely execute a program command on a memory device.

FIG. 5 illustrates an example of a process 500 to securely execute a program command on a memory device. In some implementations, the process 500 is performed by the memory controller 112 of the memory device 110 upon receiving a program memory command from the host device 120, to write data to a memory location indicated by the memory address included in the memory command. Accordingly, the following sections describe the process 500 with respect to the memory controller 112. However, the process 500 also may be performed by other devices.

The process 500 starts when the memory controller receives a program command (502). For example, the memory controller 112 receives a memory command from the host device 120.

The memory controller determines whether the memory command has to be authenticated (503). For example, in some implementations, the host device 120 sends program commands without authentication. In such cases, the program memory command does not include an authentication field, or includes an authentication field with a dummy value. In some implementations, the host device 120 sends program commands with authentication. In such cases, the program memory command has the structure 230 or the structure 240, and includes an authentication field 206 with a valid authentication value. In all the above implementations, however, an erase command is authenticated, as described with respect to the process 400.

If the memory command has to be authenticated, then the memory controller determines whether the command is successfully authenticated (504). For example, the memory controller 112 performs an authentication function on one or more bytes of the command field, or one or more bytes of the address field, or both, included in the memory command. The memory controller uses the same authentication algorithm as used by the host device 120, and performs the authentication using an agreed-upon authentication key shared with the host device 120. The memory controller 112 compares the value resulting from the authentication function with the value received in the authentication field 206 of the memory command. If the two values match, the memory controller 112 determines that the erase command is successfully authenticated. However, if the two values do not match, then the memory controller 112 determines that the erase command is not successfully authenticated.

If the program command is not successfully authenticated, then the memory controller aborts the operation (506). For example, upon determining that the program command is not successfully authenticated, the memory controller 112 discards the memory command and aborts further steps of the erase operation.

On the other hand, if the program command does not need to be authenticated, or is successfully authenticated, then the memory controller decrypts the program command (508). For example, in some implementations, the memory command structure 230 is used for the memory commands. In such implementations, the host device 120 sends the memory command with the address field 204 encrypted. The memory controller 112 decrypts the encrypted address bytes, e.g., Cipher ADD1, Cipher ADD2, Cipher ADD3 and Cipher ADD4, using an encryption/decryption algorithm and a shared symmetric key previously agreed upon with the host device (e.g., through a handshake or hardcoded, as discussed previously).

In some implementations, the memory command structure 240 is used for the memory commands. In such implementations, the host device 120 sends the memory command with both the command field 202 and the address field 204 encrypted. The memory controller 112 decrypts the encrypted command byte(s), e.g., Cipher CMD, and encrypted address bytes, e.g., Cipher ADD1, Cipher ADD2, Cipher ADD3 and Cipher ADD4, using encryption/decryption algorithms and shared symmetric keys previously agreed upon with the host device (e.g., through a handshake or hardcoded, as discussed previously).

As noted previously, in some implementations, the same encryption/decryption algorithm is used for both the command field and the address field. In other implementations, different encryption/decryption algorithms are used for the command field and the address field, for more robust security.

In some implementations, the same symmetric key is used for encryption/decryption of both the command field and the address field. In other implementations, different symmetric keys are used for encryption/decryption of the command field and the address field, for more robust security.

The memory controller determines whether the decryption is successful (510). For example, the memory controller checks whether it has successfully obtained the cleartext command, or the cleartext target memory address, or both.

If the decryption is not successful, then the memory controller aborts the operation (506). For example, the symmetric key used by the memory controller 112 may be corrupted, or the host device 120 may use a different encryption/decryption algorithm or different key (e.g., due to an incorrect handshake mechanism). In such cases, upon decrypting the erase command, the memory controller 112 may determine that the command information is incorrect (e.g., does not indicate any of read, program or erase), or the address is incorrect (e.g., outside the range of programmable addresses in the storage memory 116). Upon such a determination, the memory controller discards the memory command and aborts further steps of the program operation.

On the other hand, if the decryption is successful, then the memory controller verifies the target (512). For example, upon successful decryption, the memory controller 112 obtains the cleartext target memory address from the memory command and verifies that the target memory address maps to a programmable memory location. In some cases, the memory controller 112 verifies whether the target memory address is within the memory address range of the storage memory 116 and further is for a specific programmable memory area that is not in a locked state, such that read/program/erase operations are allowed.

After, or as part of, verifying the target, the memory controller determines whether the target is in the erase state (514). For example, the memory controller 112 checks whether the data bits of the target memory location and the corresponding tag field bits form the erase pattern, as described previously.

If the memory controller determines that the target is not in the erase state, then the memory controller aborts the operation (506). For example, the memory controller 112 may find that the pattern formed by the data bits of the target memory location and the corresponding tag field bits is different than the erase pattern, such as a pattern discussed with respect to row 320 or 330 of FIG. 3. Upon such a finding, the memory controller determines that the target memory location is not in the erase state. Accordingly, since a program operation is not allowed if the memory location is not in the erase state, the memory controller discards the memory command and aborts further steps of the program operation.

On the other hand, if the memory controller determines that the target is in the erase state, then the memory controller generates a tag for the program (516). For example, the memory controller 112 computes a parity value for the data to be written to the memory location.

The memory controller then starts to program the target memory location with the tag (518). For example, the memory controller 112 sets the bits of the target memory location according to the data to be written, and sets the bits of the tag field according to the parity value.

Accordingly, using the process 500, the devices in the system 100 (e.g., the memory controller 112 and the host device 120) perform a secure program operation on the storage memory 116. As described above, the program operation is secured using one or more security features, e.g., authenticating the memory command, encrypting the command field or the address field, or both, or verifying that the target memory location is in the erase state before allowing the program command.

Figure 6:
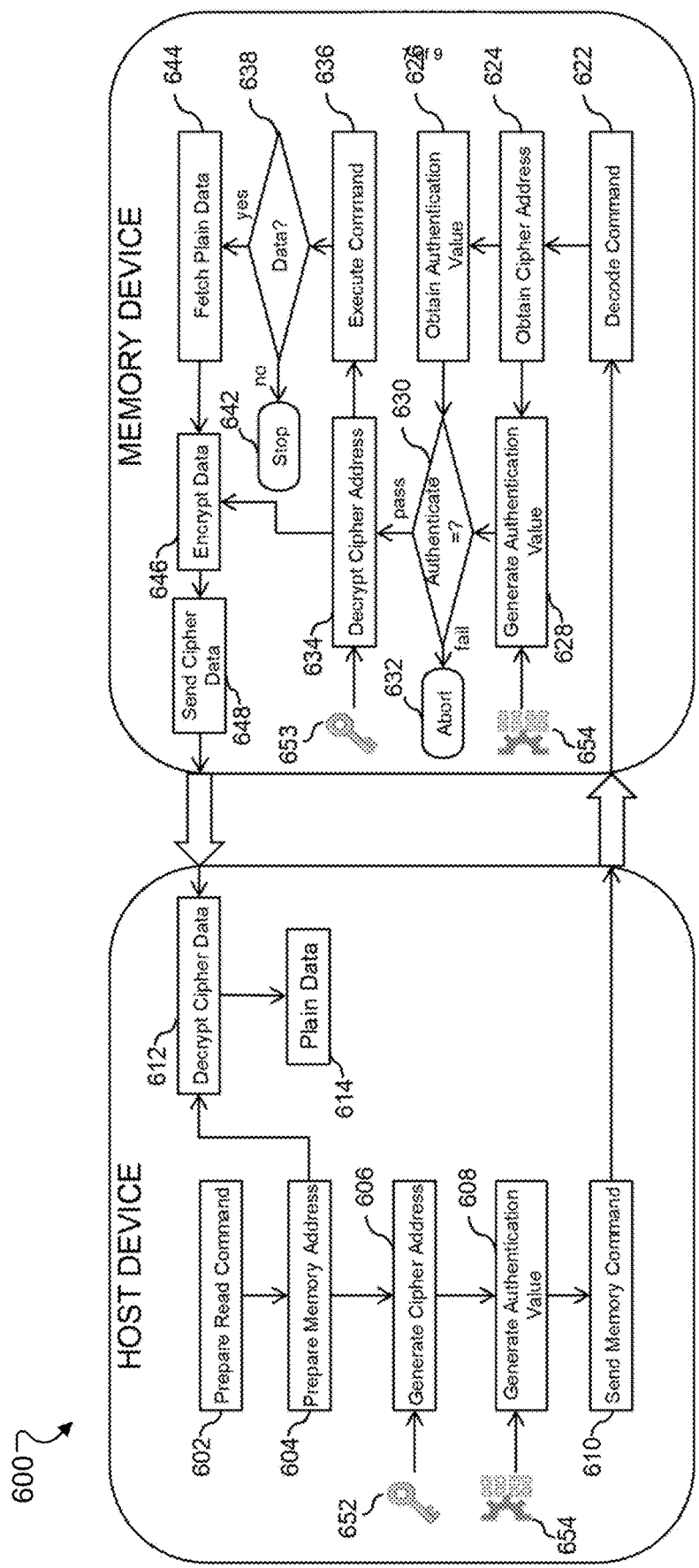
FIG. 6 illustrates an example of a process to securely execute a memory read command on a memory device.

FIG. 6 illustrates an example of a process 600 to securely execute a memory read command on a memory device. In some implementations, the process 600 is performed by the host device 120 and the memory controller 112 of the memory device 110, to read data from the storage memory 116. Accordingly, the following sections describe the process 600 with respect to the host device 120 and the memory controller 112. However, the process 600 also may be performed by other devices.

The process 600 starts when the host device prepares a read command (602). For example, in some implementations, the host device 120 generates a memory command with structure 230, and inserts a value corresponding to the read command in the command field 202.

The host device prepares a memory address for the read command (604). For example, the host device 120 determines the target memory location in the storage memory 116 that is to be read, and determines the memory address corresponding to the target memory location, such as memory address 203.

The host device generates a cipher address (606). For example, the host device 120 encrypts the target memory address using an encryption function, such as encryption function 210, and generates an encrypted or ciphered address, e.g., cipher address 214. The host device uses a key 652 to encrypt the target memory address.

The host device generates an authentication value (608). For example, the host device 120 authenticates the ciphered address using an authentication function, such as authentication function 212, and generates an authentication value, e.g., authentication value 216. In some implementations, the host uses a hash function 654, such as CRC32, to generate the authentication value.

The host device sends the memory command (610). For example, the host device 120 inserts the authentication value into the authentication field 206 of the memory command packet, encodes the packet for transmission, and sends the packet to the memory controller 112 over the bus 118.

The memory controller decodes the command upon reception (622). For example, the memory controller 112 receives the encoded memory command packet sent by the host device 120 over the bus 118, and decodes the encoded packet to determine the various fields of the memory command.

The memory controller obtains the cipher address (624). For example, the memory controller 112 obtains the encrypted address bytes from the address field 204 of the memory command structure.

The memory controller obtains the authentication value (626). For example, the memory controller 112 obtains the authentication value present in the authentication field 204 of the memory command structure.

The memory controller generates an authentication value (628). For example, the memory controller 112 generates an authentication value by applying an authentication function, such as authentication function 212, to the encrypted address bytes obtained from the address field 204. In some implementations, the memory controller 112 uses the same hash function 654 that is used by the host device 120, to generate the authentication value. In some implementations, the memory controller 112 performs the authentication using an agreed-upon authentication key shared with the host device 120.

The memory controller authenticates the memory command (630). For example, the memory controller 112 compares the authentication value it generated to the authentication value obtained from the authentication field 204 of the received memory command.

If the authentication fails, the memory controller aborts (632). For example, if the generated authentication value does not match the value obtained from the memory command, the memory controller 112 determines that the memory controller cannot be authenticated (e.g., it might have been modified in an unauthorized manner) and aborts the read operation.

On the other hand, if the memory command is successfully authenticated, then the memory controller decrypts the cipher address (634). For example, the memory controller 112 decrypts the encrypted address bytes, e.g., Cipher ADD1, Cipher ADD2, Cipher ADD3 and Cipher ADD4, using an encryption/decryption algorithm previously agreed upon with the host device (e.g., through a handshake or hardcoded, as discussed previously). The memory controller 112 uses the key 653 for the decryption operation.

In some implementations, the encryption/decryption algorithm is a symmetric algorithm, and the key 653 is a symmetric key that is same as the key 652. In other implementations, the encryption/decryption algorithm is an asymmetric algorithm. In such cases, the key 652 is a public key and the key 653 is the corresponding private key that is known only to the memory controller 112.

After decrypting the address, the memory controller executes the command (636). For example, upon successful decryption, the memory controller 112 obtains the cleartext target memory address from the memory command and accesses the target memory location corresponding to the address.

The memory controller checks whether data is stored in the memory location (638). For example, upon accessing the target memory location, the memory controller 112 checks whether valid user data is stored in the memory location. In some cases, the memory controller 112 verifies whether the target memory address is within the memory address range of the storage memory 116 and further is for a specific programmable memory area that is not in a read lock state, such that reading data from the memory location is allowed.

If the memory controller determines that data is not stored in the memory location, then the memory controller stops the read operation (642). For example, the memory controller 112 may determine that the target memory location is in an erase state (e.g., the data bits and the tag field bits form the erase pattern), or the data is corrupted. Upon determining that valid data is not stored in the memory location, the memory controller 112 stops the read operation. In some implementations, the memory controller 112 sends an error message to the host device 120.

On the other hand, if the memory controller determines that data is stored in the memory location, then the memory controller fetches the plain data (644). For example, the memory controller 112 fetches the plaintext data stored in the target memory location in the storage memory 116, and loads it into cache coupled to the memory controller.

The memory controller encrypts the data (646). For example, the memory controller 112 obfuscates (e.g., scrambles or masks) the plaintext data using a mask. In some implementations, the memory controller 112 obfuscates the data by performing an XOR logical operation with the data and the mask as inputs, generating cipher data as the output. In some implementations, the memory controller 112 uses the decrypted (plaintext) target memory address as the mask. In such cases, the mask can be the starting address of the read memory location described in the fields of a command packet, or the corresponding address of each byte of data being read.

The memory controller sends the cipher data (648). For example, the memory controller 112 sends the cipher data to the host device 120 as a response to the read memory command that it received.

The host device decrypts the cipher data (612). For example, upon receiving the scrambled cipher data from the memory controller 112, the host device 120 descrambles the cipher data. The host device 120 uses the same mask as used by the memory controller 112, e.g., in some implementations, the plaintext target memory address. The host device 120 applied the same XOR operation with the mask, which reverses the scrambling.

The host device obtains the plain data (614). For example, upon performing the XOR operation on the received cipher data with the same mask as used by the memory controller 112, the host device 120 reverses the effect of the scrambling and obtains the data in plaintext. The host device 120 subsequently performs other operations with the plaintext data.

Accordingly, using the process 600, the devices in the system 100 (e.g., the memory controller 112 and the host device 120) perform a secure read operation on the storage memory 116. As described above, the read command operation is secured using one or more security features, e.g., authentication and encryption. The response to the read command is secured by scrambling the data and sending the cipher data over the bus, thereby preventing an eavesdropper from reading the data.

As described previously, in some implementations, the authentication function used for authenticating the memory command is a hash function. In particular, in some implementations, a CRC algorithm is used for the authentication. CRC can be resource-efficient, since the CRC function can be implemented as a linear feedback shift register (LFSR). When a CRC algorithm is used, both the host device and the memory controller agree on the algorithm and the token, e.g., a polynomial, used for the secure hash. A generator polynomial for the CRC is kept secret, known only to the host device and the memory controller. Either the host device, or the memory controller, or both, uses a known secret key, e.g., of size 128 bits or 256 bits, and computes an irreducible polynomial using the secret key. In some implementations, the polynomial is constructed or selected from a commonly shared secret key separately by the host device and the memory controller. In some implementations, the host device, e.g., host device 120, constructs or selects the polynomial from a secret key known to the host device. The host device sends the polynomial in an encrypted message to the memory controller, which decrypts the message and obtains the polynomial.

Figure 7A:
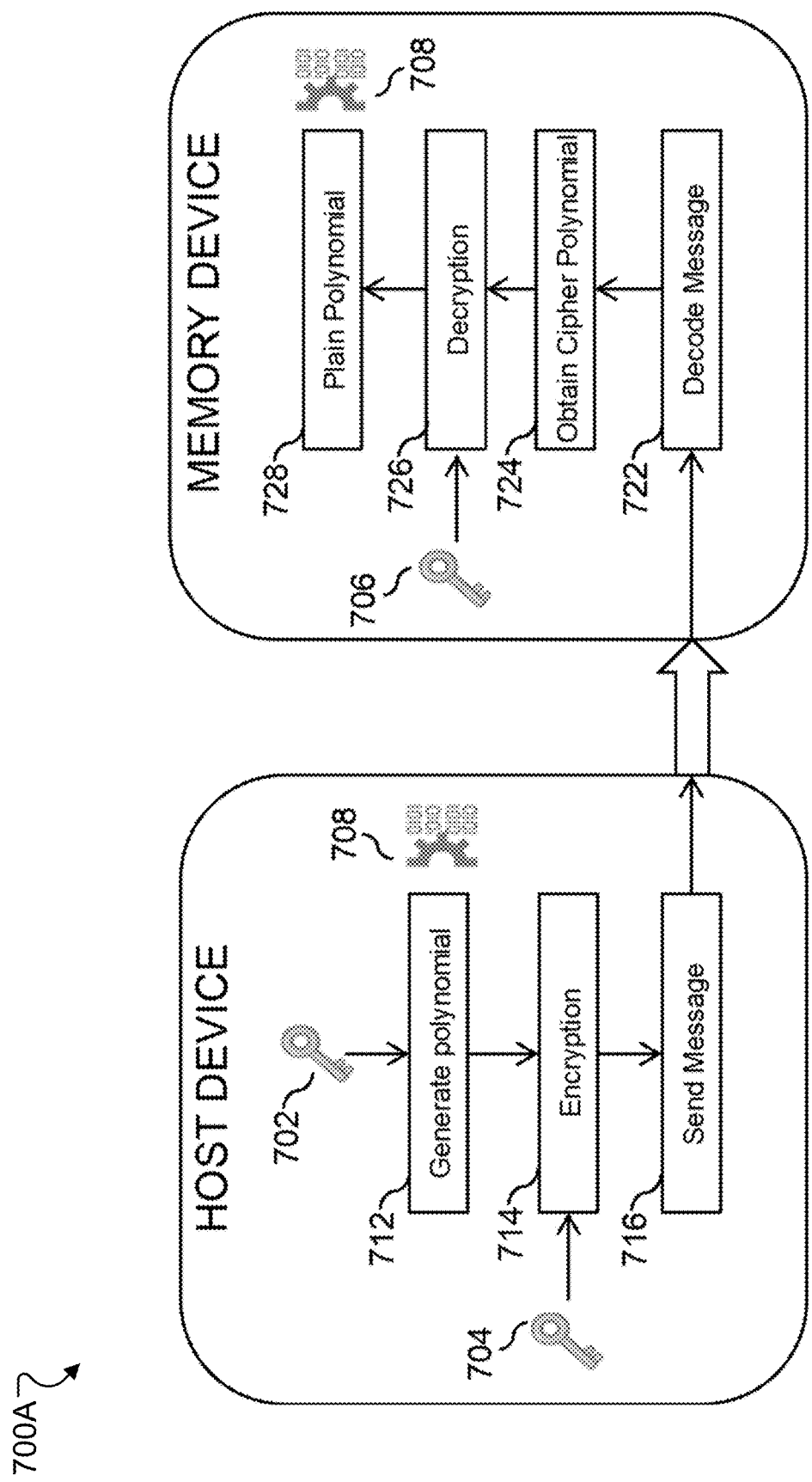
FIGS. 7A and 7B illustrate example processes to determine a generator polynomial by a host device and a memory controller.
Figure 7B:
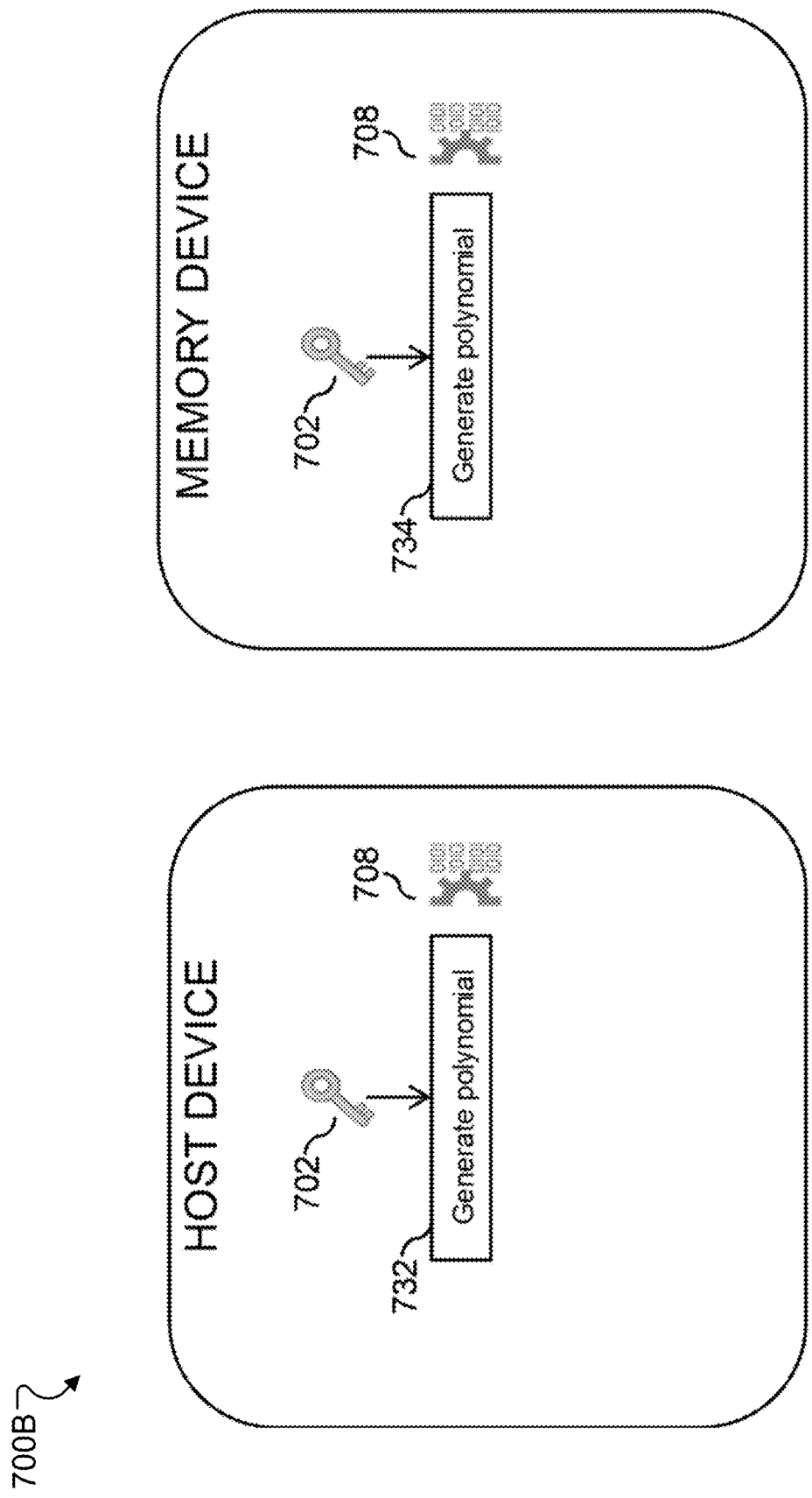

FIGS. 7A and 7B illustrate example processes 700A and 700B, respectively, to determine a generator polynomial by a host device and a memory controller. In some implementations, the processes 700A and 700B are performed by the host device 120 and the memory controller 112 of the memory device 110. Accordingly, the following sections describe the processes 700A and 700B with respect to the host device 120 and the memory controller 112. However, the processes 700A or 700B, or both, also may be performed by other devices.

FIG. 7A shows the process 700A, in which the host device 120 generates the polynomial and sends the polynomial to the memory controller 112. The process 700A is used in implementations where only one of the two entities, e.g., the host device 120, knows the secret generator key for the polynomial. Although the process is described with respect to the host device 120 having the secret generator key, the process is also applicable to implementations where only the memory controller 112 has the secret generator key.

The process 700A starts with the host device generating a polynomial (712). For example, the host device 120 uses a secret key 702 and generates a polynomial for a CRC hash algorithm 708, which is to be used for authenticating memory commands.

The host device encrypts the polynomial (714). For example, the host device 120 performs an encryption on the polynomial using a key 704.

The host device sends a message (716), which includes a command code and the encrypted polynomial. For example, the host device 120 includes the encrypted polynomial in a message and encodes the message for transmission. The host device sends the encoded message to the memory controller 112 over the bus 118.

The memory controller decodes the message (722). For example, the memory controller 112 receives the encoded transmission from the host device 120 over the bus 118, and decodes the transmission to obtain the message. Upon decoding, the memory controller 112 obtains the command code from the command field in the message and determines the operation to be performed.

The memory controller obtains the cipher polynomial (724). For example, the memory controller 112 extracts the encrypted polynomial from the message.

The memory controller decrypts the polynomial (726). For example, the memory controller 112 performs a decryption on the polynomial using a key 706. As discussed previously, in some implementations, a symmetric encryption/decryption algorithm is used by the host device and the memory controller, with the key 704 being same as the key 706. In some implementations, an asymmetric encryption/decryption algorithm is used (e.g., public key cryptography), with the key 704 being a public key and the key 706 is the corresponding private key that is known only to the memory controller 112.

The memory controller obtains the plain polynomial (728). For example, upon a successful decryption, the memory controller 112 obtains the secret polynomial that was generated by the host device 120. The host device 120 and the memory controller 112 can now use the CRC hash algorithm with the secret polynomial to authenticate memory commands.

FIG. 7B shows the process 700B in which the host device 120 and the memory controller 112 independently generates the polynomial. The process 700B is used in implementations where both the host device and the memory device know the secret generator key for the polynomial.

The process 700B starts with the host device generating a polynomial (732) and the memory controller generating the polynomial independently (734). For example, the host device 120 uses secret key 702 and generates a polynomial for the CRC hash algorithm 708. Independently, the memory controller 112 also uses the secret key 702 and generates the polynomial for the CRC hash algorithm 708. The host device 120 and the memory controller 112 can now use the CRC hash algorithm with the secret polynomial to authenticate memory commands.

It is to be noted that although process steps, method steps, algorithms or the like may be described in a sequential order above, such processes, methods and algorithms may generally be configured to work in alternate orders, unless specifically stated to the contrary.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   receiving, at a memory controller managing a memory device, a memory command;
   performing, by the memory controller, an authentication function corresponding to the memory command;
   in response to the performance of the authentication function resulting in a successful authentication of the memory command, determining, by the memory controller, whether the memory command is encrypted;
   upon determining that the memory command is encrypted, performing, by the memory controller, a decryption function corresponding to the memory command; and
   conditioned on the performance of the decryption function resulting in a successful decryption of the memory command, performing, by the memory controller, an operation on a memory location corresponding to a memory address included in the memory command.

2. The method of claim 1, wherein the memory command is an erase command, and wherein performing the operation on the memory location comprises:
   performing an erase operation on a memory block corresponding to the memory address.

3. The method of claim 1, wherein the memory command is a program command, and wherein performing the operation on the memory location comprises:
   verifying the memory location corresponding to the memory address;
   determining whether the memory location is in an erase state; and
   upon determining that the memory location is in the erase state:
   generating a tag for the program command, and
   performing a program operation on the memory location, the program operation including modifying the tag in accordance with the program operation.

4. The method of claim 3, wherein the memory location includes data bits and tag bits,
   wherein determining that the memory location is in the erase state comprises determining that every data bit and every flag bit in the memory location is set to a preselected value, and
   wherein an aggregation of every data bit and every flag bit with the preselected value forms a known pattern.

5. The method of claim 4, wherein the tag bits include one of the preselected value, an error-correcting code (ECC) value corresponding to the data bits, a cyclic redundancy check (CRC) value corresponding to the data bits, or a flag value corresponding to the data bits.

6. The method of claim 3, further comprising:
   upon determining that at least a portion of the memory location is not in an erase state, aborting the program operation.

7. The method of claim 6, wherein the memory location includes data bits and tag bits,
   wherein determining that at least a portion of the memory location is not in the erase state comprises determining that at least a data bit or a flag bit in the memory location is set to a value other than a preselected value, or that an aggregation of all data bits and flag bits forms a pattern that is different from a known pattern.

8. The method of claim 3, wherein the memory location includes a memory block,
   wherein determining that the memory location is in the erase state comprises determining that the memory block is in the erase state, and
   wherein performing the program operation on the memory location comprises performing the program operation on one of a byte, word, or group of bytes included in the memory block.

9. The method of claim 1, wherein performing the authentication function corresponding to the memory command comprises:
   upon receiving the memory command, determining, by the memory controller, whether the memory command includes authentication information; and
   upon determining that the memory command includes authentication information, performing, by the memory controller, the authentication function corresponding to the memory command.

10. The method of claim 1, further comprising:
    conditioned on at least one of the performance of the authentication function failing to authenticate the memory command, or the performance of the decryption function failing to successfully decrypt the memory command, discarding the memory command without performing the operation on the memory location.

11. The method of claim 9, wherein determining that the memory command includes authentication information comprises determining that the memory command includes a hash value field generated by performing a hash function on one or more of a command byte or a memory address byte included in the memory command.

12. The method of claim 9, wherein the authentication function includes one of a 32-bit Cyclic Redundancy Check (CRC) algorithm (CRC32), or a 16-bit CRC algorithm (CRC16).

13. The method of claim 1, wherein determining that the memory command is encrypted comprises determining that one or more of a command byte or a memory address byte included in the memory command is encrypted.

14. The method of claim 1, wherein the memory command includes a read command, and wherein performing the operation on the memory location comprises performing a read operation on the memory location, the method further comprising:
retrieving, by the memory controller, user data stored in the memory location;
encrypting the user data; and
sending the encrypted user data to a host device coupled to the memory device.

15. The method of claim 14, wherein encrypting the user data comprises obfuscating the user data using a mask value.

16. The method of claim 15, wherein the mask value corresponds to the memory address, and
wherein obfuscating the user data comprises combining the user data with the mask value using a logical operation.

17. The method of claim 1, wherein the memory command is generated by a host device coupled to the memory device, the method further comprising:
determining, by the host device, the operation to be performed;
generating, by the host device, a command field corresponding to the operation;
determining, by the host device, the memory address for the memory location;
encrypting, by the host device, the memory address using a cryptographic mechanism shared with the memory controller;
generating, by the host device, the memory command by a concatenation of the command field and the encrypted memory address; and
sending, by the host device, the memory command to the memory controller.

18. The method of claim 17, wherein generating the memory command further comprises:
determining, by the host device, whether an authentication option is enabled;
in response to determining that the authentication option is enabled, generating, by the host device, an authentication value corresponding to at least one of the command field or the encrypted memory address; and
generating, by the host device, the memory command by a concatenation of the command field, the encrypted memory address and the authentication value.

19. The method of claim 17, wherein the memory command is a program command, and wherein generating the memory command further comprises:
appending, by the host device, user data fields to the concatenation of the command field and the encrypted memory address.

20. The method of claim 17, wherein encrypting the memory address using the cryptographic mechanism comprises encrypting using a format preserving mechanism, wherein a format of the encrypted memory address is same as a format of the memory address without encryption.

21. A system comprising:
a memory controller that manages a memory device, wherein the memory controller is configured to perform operations comprising:
receiving a memory command;
performing an authentication function corresponding to the memory command;
in response to the performance of the authentication function resulting in a successful authentication of the memory command, determining whether the memory command is encrypted;
upon determining that the memory command is encrypted, performing a decryption function corresponding to the memory command; and
conditioned on the performance of the decryption function resulting in a successful decryption of the memory command, performing an operation on a memory location corresponding to a memory address included in the memory command.

22. The system of claim 21, wherein the memory command is an erase command, and wherein performing the operation on the memory location comprises:
performing an erase operation on a memory block corresponding to the memory address.

23. The system of claim 21, wherein the memory command is a program command, and wherein performing the operation on the memory location comprises:
verifying the memory location corresponding to the memory address;
determining whether the memory location is in an erase state; and
upon determining that the memory location is in the erase state:
generating a tag for the program command, and
performing a program operation on the memory location, the program operation including modifying the tag in accordance with the program operation.

24. The system of claim 21, wherein performing the authentication function corresponding to the memory command comprises:
upon receiving the memory command, determining whether the memory command includes authentication information; and
upon determining that the memory command includes authentication information, performing the authentication function corresponding to the memory command.

25. The system of claim 21, wherein determining that the memory command is encrypted comprises determining that one or more of a command byte or a memory address byte included in the memory command is encrypted.

26. The system of claim 21, wherein the memory command includes a read command, and wherein performing the operation on the memory location comprises performing a read operation on the memory location, and wherein the memory controller is configured to perform operations further comprising:
retrieving user data stored in the memory location;
encrypting the user data; and sending the encrypted user data to a host device coupled to the memory device.

27. The system of claim 21, further comprising:
a host device coupled to the memory device and configured to generate the memory command, wherein the host device is configured to perform operations comprising:
determining the operation to be performed;
generating a command field corresponding to the operation;
determining the memory address for the memory location;
encrypting the memory address using a cryptographic mechanism shared with the memory controller;
generating the memory command by a concatenation of the command field and the encrypted memory address; and
sending the memory command to the memory controller.

* * * * *